United States Patent
Lin

(10) Patent No.: US 11,895,043 B2
(45) Date of Patent: Feb. 6, 2024

(54) METHOD FOR ACCESSING SYSTEM MEMORY AND ASSOCIATED PROCESSING CIRCUIT WITHIN A NETWORK CARD

(71) Applicant: Realtek Semiconductor Corp., HsinChu (TW)

(72) Inventor: Chia-Hung Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/994,020

(22) Filed: Nov. 25, 2022

(65) Prior Publication Data

US 2023/0171207 A1 Jun. 1, 2023

(30) Foreign Application Priority Data

Nov. 29, 2021 (TW) .................................. 110144419

(51) Int. Cl.
*H04L 49/901* (2022.01)
*H04L 49/90* (2022.01)

(52) U.S. Cl.
CPC ........ *H04L 49/901* (2013.01); *H04L 49/9042* (2013.01)

(58) Field of Classification Search
CPC ........................... H04L 49/901; H04L 49/9042
See application file for complete search history.

(56) References Cited

U.S. PATENT DOCUMENTS

| | | | |
|---|---|---|---|
| 8,943,240 B1 * | 1/2015 | Subramanian | G06F 13/28 710/28 |
| 2004/0057380 A1 | 3/2004 | Biran | |
| 2005/0080952 A1 * | 4/2005 | Oner | G06F 13/28 710/52 |
| 2006/0268913 A1 * | 11/2006 | Singh | H04L 49/9042 370/474 |

FOREIGN PATENT DOCUMENTS

JP 2003163702 A * 6/2003

* cited by examiner

*Primary Examiner* — Samina F Choudhry
(74) *Attorney, Agent, or Firm* — Winston Hsu

(57) ABSTRACT

The present invention provides a method for accessing a system memory, wherein the method includes the steps of: reading a descriptor from the system memory, where the descriptor includes a buffer start address field and a buffer size field, wherein the buffer start address field includes a start address of a buffer in the system memory, and the buffer size field indicates a size of the buffer; receiving multiple packets, and writing the multiple packets in to the buffer; modifying the descriptor according to the multiple packets stored in the buffer to generate a modified descriptor, wherein the modified descriptor only comprises information of part of the multiple packets or does not comprise information of any one of the multiple packets; and writing the modified descriptor into the system memory.

18 Claims, 5 Drawing Sheets

METHOD FOR ACCESSING SYSTEM MEMORY AND ASSOCIATED PROCESSING CIRCUIT WITHIN A NETWORK CARD

BACKGROUND OF THE INVENTION

1. Field of the Invention

The present invention relates a method for accessing a system memory.

2. Description of the Prior Art

When an electronic device receives a packet from an external device, the packet and related parsing information are temporarily stored in a system memory for subsequent processing. In the storage of the parsing information, the following two methods can be used. The first method is to configure a complete and continuous memory space in the system memory, and use the parsing information of each packet as a header of the packet to store in this memory space. However, since each packet must be continuously stored in this memory space, and a number of packets to be processed are increased due to the rapid increase of the network connection speed, therefore, it is very difficult to find a complete and continuous memory space with a large capacity in the system memory. In order to solve the problem of the first method, the second method is to use multiple descriptor to describe multiple packets respectively, and each packet can be stored in a different address in the system memory, and the processor can know the address of the packet in the system memory through an index of the corresponding descriptor. Although the second method does not need to configure a complete and continuous memory space in the system memory, however, if a large number of small packets are received, a number of times of reading and writing of the descriptor will be too frequent, thereby causing waste of bandwidth and lack of bandwidth, and cannot transmit the packets efficiently.

SUMMARY OF THE INVENTION

It is therefore an objective of the present invention to provide a method for accessing a system memory, which can effectively reduce the number of times of reading and writing the descriptors without configuring a complete and continuous memory space in the system memory, to solve the problems described in the prior art.

According to one embodiment of the present invention, a method for accessing a system memory comprises the steps of: reading a descriptor from the system memory, where the descriptor comprises a buffer start address field and a buffer size field, wherein the buffer start address field comprises a start address of a buffer in the system memory, and the buffer size field indicates a size of the buffer; receiving multiple packets, and writing the multiple packets in to the buffer; modifying the descriptor according to the multiple packets stored in the buffer to generate a modified descriptor, wherein the modified descriptor only comprises information of part of the multiple packets or does not comprise information of any one of the multiple packets; and writing the modified descriptor into the system memory.

According to one embodiment of the present invention, a processing circuit within a network card is configured to perform the steps of: reading a descriptor from a system memory external to the network card, where the descriptor comprises a buffer start address field and a buffer size field, wherein the buffer start address field comprises a start address of a buffer in the system memory, and the buffer size field indicates a size of the buffer; receiving multiple packets, and writing the multiple packets in to the buffer; modifying the descriptor according to the multiple packets stored in the buffer to generate a modified descriptor, wherein the modified descriptor only comprises information of part of the multiple packets or does not comprise information of any one of the multiple packets; and writing the modified descriptor into the system memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
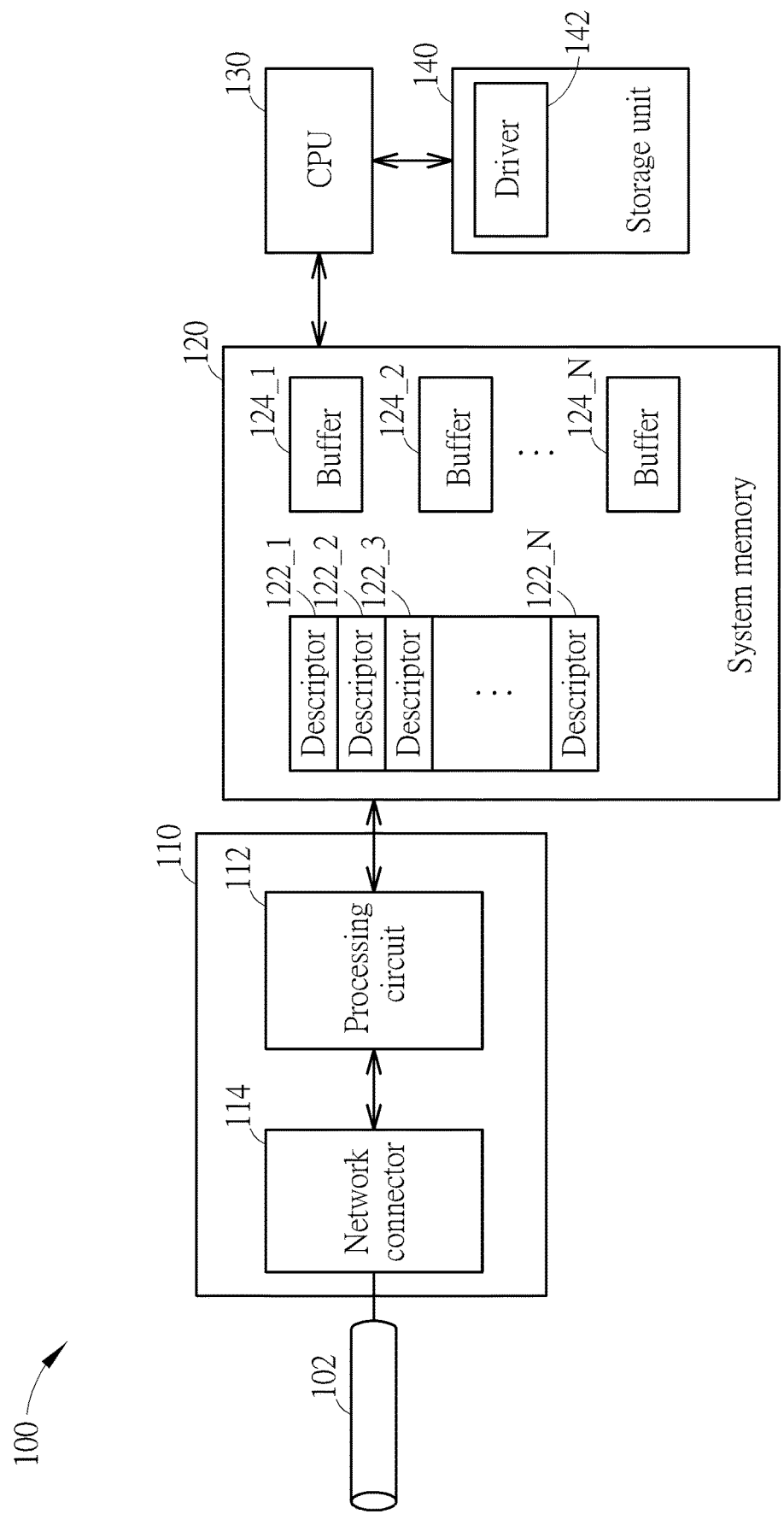
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises a network card 110, a system memory 120, a central processing unit (CPU) 130 and a storage unit 140, wherein the network card 110 comprises a processing circuit 112 and a network connector 114, and the network connector 114 is used to connect a network cable (e.g., Ethernet cable) 102. The system memory 120 can be implemented by using static random access memory (SRAM) or dynamic random access memory (DRAM), and the system memory 120 comprises multiple regions, wherein one region is used to store multiple descriptors 122_1-122_N, and the descriptors 122_1-122_N are used to point to multiple buffers 124_1-124_N, respectively. The storage unit 140 comprises at least one driver 142, wherein the driver 142 is used to perform operations related to the network card 110. In this embodiment, the electronic device 100 can be any electronic device that needs to use a network function, such as a desktop computer, a notebook, etc., and the network card 110 can be built in or externally connected to the electronic device 100.

In this embodiment, each of the descriptors 122_1-122_N has a fixed size such as 16 bytes or 32 bytes. In one embodiment, not a limitation of the present invention, the descriptors 122_1-122_N are located at fixed addresses in the system memory 120, and the descriptors 122_1-122_N are consecutive in the memory addresses. In another embodiment, the descriptors 122_1-122_N do not necessarily have fixed addresses in the system memory 120, and the descriptors 122_1-122_N do not necessarily have to be consecutive in the memory addresses, as long as the descriptor can point out a memory address of a next descriptor, for example, the descriptor 122_1 contains information pointing to a starting memory address of descriptor 122_2. In addition, the addresses of the plurality of buffers 124_1-124_N in the system memory 120 may not be fixed, and the buffers 124_1-124_N may be discontinuous in memory addresses.

In the operation of the electronic device 100, the CPU 130 reads the driver 142 from the storage unit 140, and executes the driver 142 to start operations related to the network card 110, that is, to receive packets from the network card 110 through the network cable 102, or transmit data to other electronic devices through the network card 110. In addition, the system memory 120 is used to temporarily store packets from the external devices, data that need to be transmitted to other electronic devices through the network card 110, or other system data. Since the key point of the present invention is to provide a method for storing packets and related information, the following embodiments only describe the content of the electronic device 100 receiving packets from the external device and storing the packets in the system memory 120.

First, the CPU 130 prepares the contents of the descriptors 122_1-122_N in the system memory 120, wherein the descriptors 122_1-122_N are used to describe the information of the corresponding buffers 124_1-124_N respectively. For example, referring to the diagram of descriptor 122_1 shown in FIG. 2, the descriptor 122_1 includes at least three fields, which are an own bit field, a buffer start address field, and a buffer size field. The own bit field is used to indicate whether the descriptor 122_1 is currently available to the network card 110, for example, the CPU 130 sets the own bit to "0" to indicate that the network card 110 can use descriptor 122_1 and the corresponding buffer 124_1. The buffer start address field is used to indicate a start address of the buffer 124_1 in the system memory 120, and the buffer size field is used to indicate the size of the buffer 124_1. Similarly, each of the other descriptors 122_2-122_N may also have the same architecture, for example, the descriptor 122_2 includes the own bit, the start address and the size of the corresponding buffer 124_2, and so on.

In one embodiment, the buffers 124_1-124_N do not have fixed addresses. For example, when the CPU 130 prepares the content of the descriptor 122_1 next time, the buffers 124_1 may have different addresses, and the start address of the buffer recorded in the descriptor 122_1 will also be different. In one embodiment, the size of each buffer 124_1-124_N is greater than or equal to maximum data amount of one Ethernet packet, such as 1.5 kilobytes (KB), but it's not a limitation of the present invention. In another embodiment, the size of each of the buffers 124_1-124_N may be smaller than the maximum data amount of one Ethernet packet.

Then, when the processing circuit 112 of the network card 110 receives one or more packets from the external device, the processing circuit 112 reads at least part of the descriptors 122_1-122_N in sequence to determine which descriptor can be used by the processing circuit 112. For example, the processing circuit 112 sequentially reads the own bits of at least part of the descriptors 122_1-122_N, and selects the descriptor whose own bit is "0" to perform subsequent operations. For the convenience of description, the following embodiments are described with the processing circuit 112 selecting the descriptor 122_1.

After reading the descriptor 122_1, the processing circuit 112 determines how many currently received packets can be stored in the buffer 124_1 according to the buffer size of the buffer 124_1 recorded in the descriptor 122_1. Taking FIG. 3 as an example, assuming that packet #0-packet #2 are currently received, and the total data amount of packet #0-packet #2 with the related header #0-header #2 is less than the size of the buffer 124_1, the processing circuit 112 can create a corresponding header according to each packet to record the information of the packet, and write the headers together with the packets into the buffer 124_1 in sequence. Specifically, the processing circuit 112 may create a header #0 of the packet #0, wherein the header #0 records the size of the packet #0 and related information, such as an error check code (e.g., checksum), and the processing circuit 112 writes the header #0 and the packet #0 to the buffer 124_1 sequentially and continuously. Then, the processing circuit 112 may create a header #1 of the packet #1, wherein the header #1 records the size of the packet #1 and related information; and the processing circuit 112 writes the header #1 and the packet #1 to the buffer 124_1 sequentially and continuously, wherein the header #1 is immediately after the packet #0. Then, the processing circuit 112 may create a header #2 of the packet #2, wherein the header #2 records the size of the packet #2 and related information; and the processing circuit 112 writes the header #2 and the packet #2 to the buffer 124_1 sequentially and continuously, wherein the header #2 is immediately after the packet #1.

In this embodiment, since the size of the next packet received by the processing circuit 112 is larger than the remaining space of the buffer 124_1, the processing circuit 112 will not continue to store the next packet in the buffer 124_1, and the remaining space of the buffer 124_1 can be blank without storing any data, or storing invalid data (dummy data).

After the packets #0-#2 are written into the buffer 124_1, the processing circuit 112 modifies the content of the descriptor 122_1, so that the modified descriptor 112_1_A includes at least four fields, which are own bit field, first packet information field, multi-packet tag field, and total data amount/total packet number field. In this embodiment, the own bit may have a bit "1" to indicate that the corresponding buffer 124_1 has stored the packet, and may also be used to inform the CPU 130 that it can read the packet from the buffer 124_1. The first packet information field may contain the start address of the header #0 of the packet #0, that is the start address of the buffer 124_1. The multi-packet tag field is used to indicate whether the buffer 124_1 stores multiple packets. For example, the multi-packet tag can be represented by a single bit, wherein the bit "1" indicates that the buffer 124_1 currently stores two or more packets, and the bit "0" indicates that the buffer 124_1 currently only stores one packet. The total data amount/total packet number field records the data amount of all the data currently stored in the buffer 124_1, or the number of stored packets in the buffer 124_1. For example, the buffer 124_1 shown in FIG. 3 stores three packets.

After the processing circuit 112 modifies the descriptor 122_1, the processing circuit 112 stores a modified descriptor 112_1_A back to the original address of the descriptor 122_1 in the system memory 120, that is, the processing circuit 112 uses the modified descriptor 112_1_A to overwrite the descriptor 122_1.

Then, the CPU 130 reads and analyzes the own bits in the descriptors 122_1-122_N, and reads the descriptor (s) whose own bits is/are "1". In this embodiment, the CPU 130 reads the modified descriptor 112_1_A, and sequentially reads the header #0, the packet #0, the header #1, the packet #1, the header #2 and the packet #2 in the buffer 124_1 according to the information in the modified descriptor 112_1_A, for subsequent processing. In this embodiment, since the modified descriptor 112_1_A provides the multi-packet tag field and the total data amount/total packet number field, the CPU 130 can accurately know how much data or how many packets need to be read from the buffer 124_1.

After the CPU 130 successfully reads the data in the buffer 124_1, the CPU 130 may re-modify the modified descriptor 112_1_A to the descriptor 112_1. For example, the CPU 130 uses the original descriptor 112_1 to overwrite the modified descriptor 112_1_A, for use by the processing circuit 112 of the network card 110 to store subsequent packets.

In the above embodiment, since the buffer pointed to by a single descriptor can store multiple packets, the CPU 130 does not need to prepare too many descriptors 122_1-122_N in the system memory 120 for use when receiving a large number of small packets. Therefore, the space dedicated to storing the descriptors 122_1-122_N in the system memory 120 can also be greatly reduced. In addition, although a buffer is allowed to store multiple packets, since the related information of the packets (i.e., headers) are also stored in the buffer, the descriptor does not need to describe the content of each packet in the buffer. Therefore, the size of the descriptor can be effectively reduced to avoid occupying too much space in the system memory 120.

Figure 2:
FIG. 2 shows descriptors prepared by a central processing unit and modified descriptors generated by a processing circuit according to one embodiment of the present invention.
Figure 3:
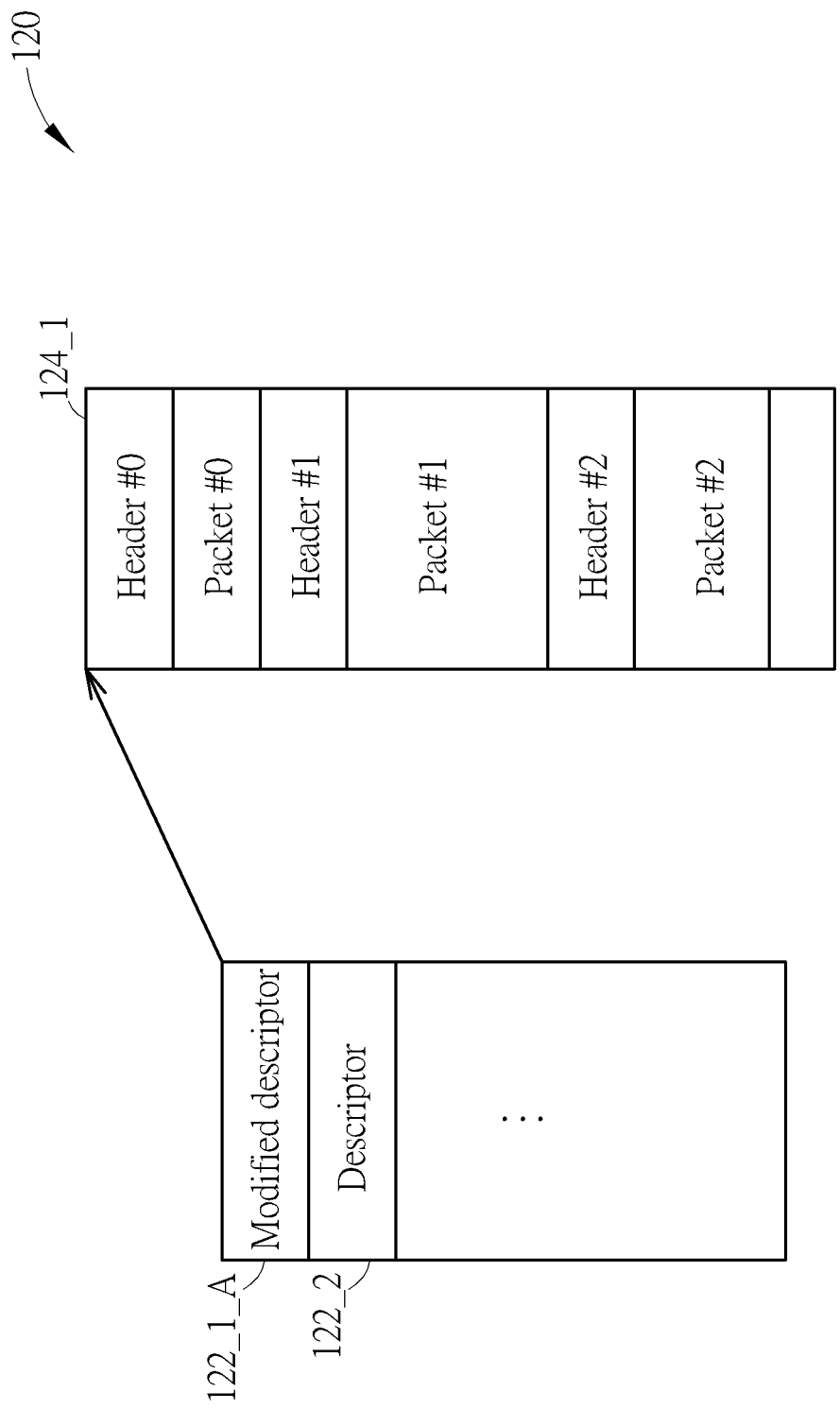
FIG. 3 shows a modified descriptor and corresponding buffer according to one embodiment of the present invention.
Figure 4:
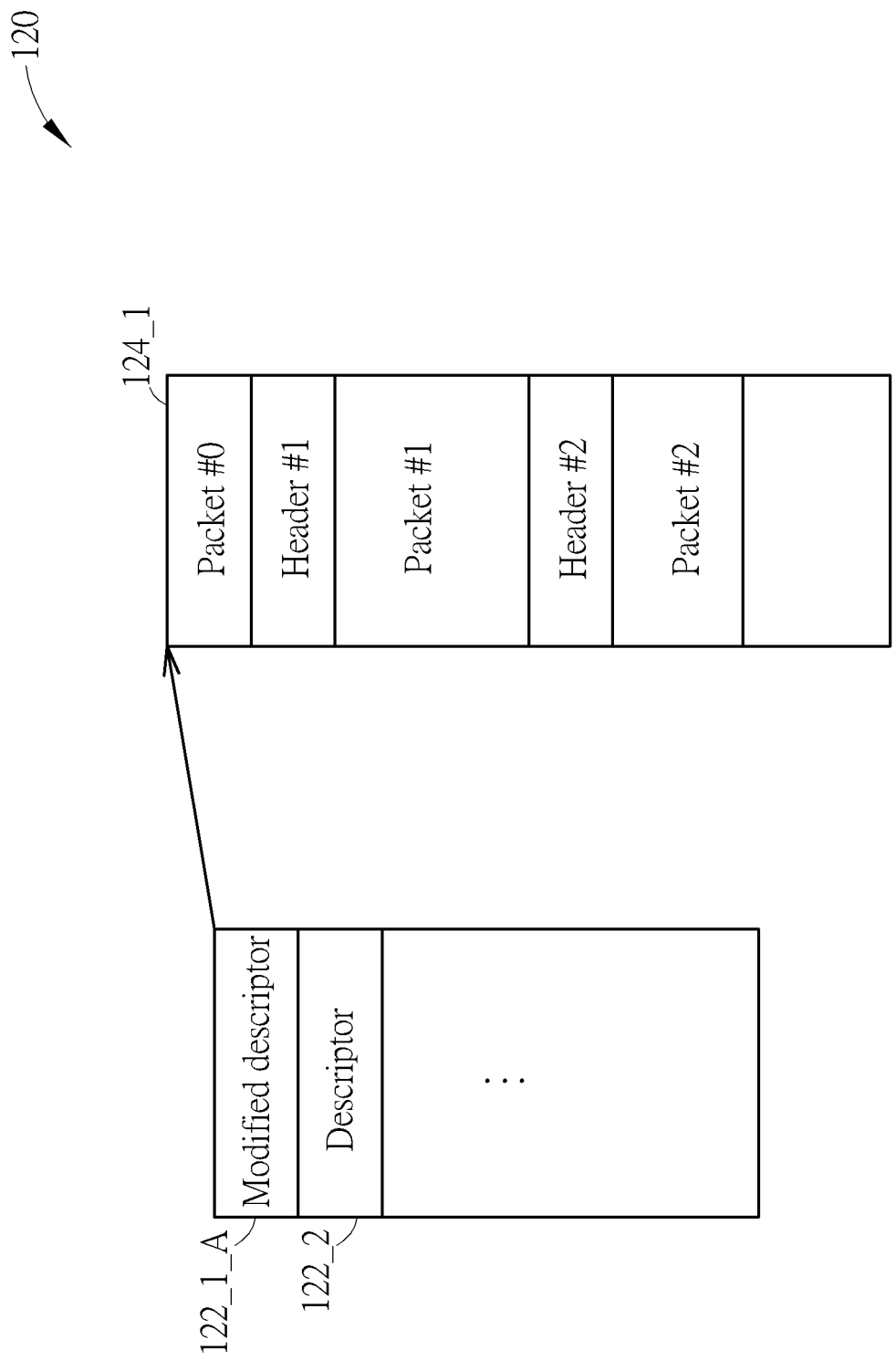
FIG. 4 shows a modified descriptor and corresponding buffer according to another embodiment of the present invention.

In the embodiments shown in FIG. 2 and FIG. 3, the buffer 124_1 stores the header #0, the packet #0, the header #1, the packet #1, the header #2 and the packet #2 in sequence, and the first packet information in the modified descriptor 112_1_A indicates the start address of the header #0. In other embodiments, as shown in FIG. 4, the first packet information field in the modified descriptor 112_1_A may directly contain the related information of the packet #0, such as the size of packet #0 and the error check code, and the buffer 124_1 itself does not need to store the related information of the packet #0, that is, the buffer 124_1 stores the packet #0, the header #1, the packet #1, the header #2 and the packet #2 in sequence. This alternative design shall fall within the scope of the present invention.

Figure 5:
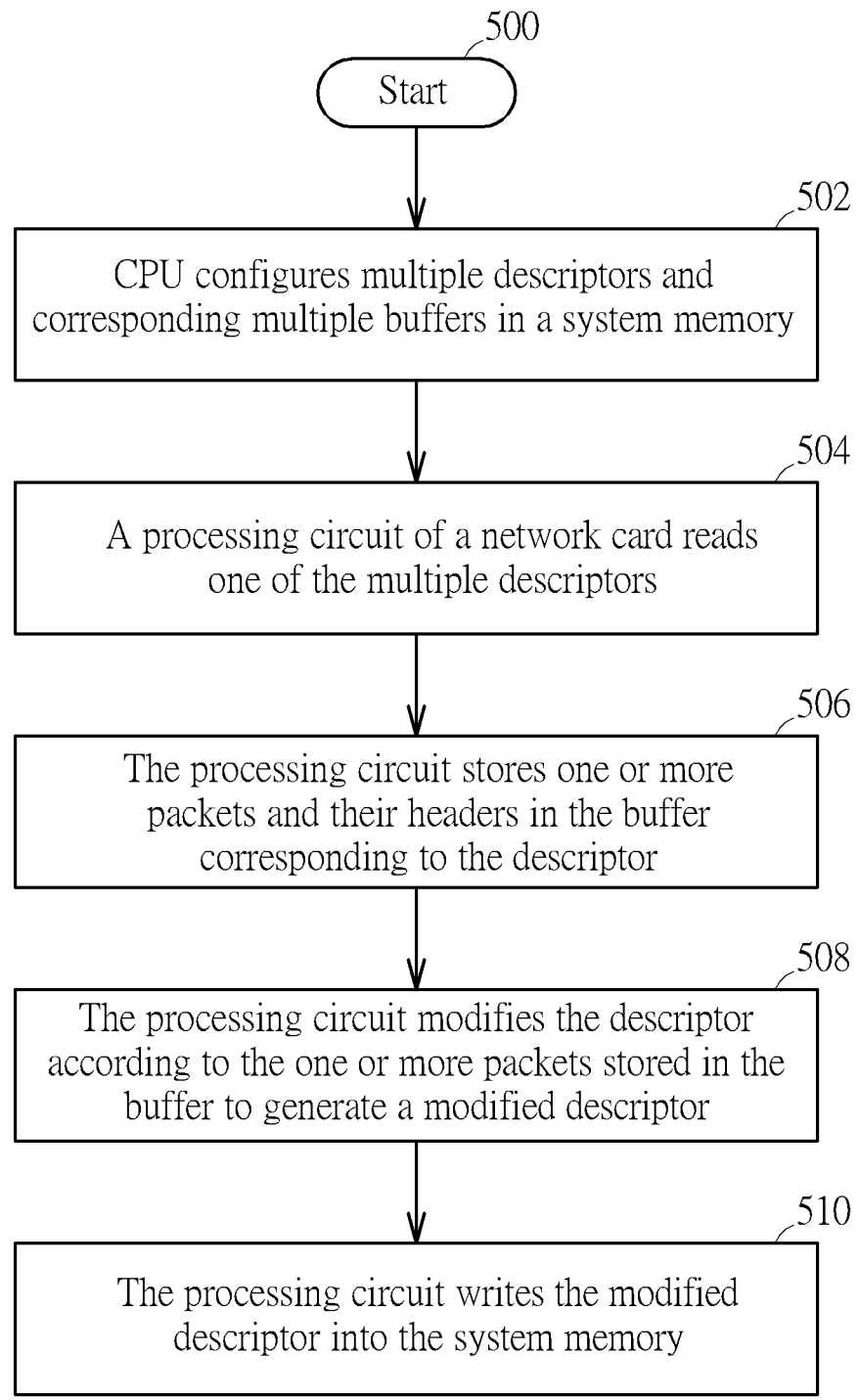
FIG. 5 is a flowchart of a method for accessing a system memory according to one embodiment of the present invention.

FIG. 5 is a flowchart of a method for accessing a system memory according to one embodiment of the present invention. Referring to the above embodiments to together, the flow of FIG. 5 is described as follows.

Step 500: the flow starts.

Step 502: CPU configures multiple descriptors and corresponding multiple buffers in a system memory.

Step 504: a processing circuit of a network card reads one of the multiple descriptors.

Step 506: the processing circuit stores one or more packets and their headers in the buffer corresponding to the descriptor.

Step 508: the processing circuit modifies the descriptor according to the one or more packets stored in the buffer to generate a modified descriptor.

Step 510: the processing circuit writes the modified descriptor into the system memory.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for accessing a system memory, comprising:
   reading a descriptor from the system memory, where the descriptor comprises a buffer start address field and a buffer size field, wherein the buffer start address field comprises a start address of a buffer in the system memory, and the buffer size field indicates a size of the buffer;
   receiving multiple packets, and writing the multiple packets in to the buffer;
   modifying the descriptor according to the multiple packets stored in the buffer to generate a modified descriptor, wherein the modified descriptor only comprises information of part of the multiple packets or does not comprise information of any one of the multiple packets; and
   writing the modified descriptor into the system memory.

2. The method of claim 1, wherein the step of receiving the multiple packets, and writing the multiple packets in to the buffer comprises:
   generating headers of the multiple packets, respectively, wherein the header of each packet comprises the information of the packet; and
   writing the multiple packets with the corresponding headers into the buffer in sequence.

3. The method of claim 2, wherein the step of modifying the descriptor according to the multiple packets stored in the buffer to generate the modified descriptor comprises:
   modifying the descriptor to add a first packet information field and a total data amount/total packet number field to generate the modified descriptor according to the multiple packets written into the buffer, wherein the first packet information field comprises the start address of the buffer in the system memory or an address of the header of a first packet of the plurality of packets; and the total data amount/total packet number field records total amount of data stored in the buffer or a number of the multiple packets.

4. The method of claim 3, wherein the modified descriptor further comprises a multi-packet tag field, wherein the multi-packet tag field records whether the buffer stores multiple packets or only one packet.

5. The method of claim 2, wherein the information of the packet comprises a size of the packet.

6. The method of claim 1, wherein the multiple packets comprise a first packet and at least one second packet; and the step of receiving the multiple packets, and writing the multiple packets in to the buffer comprises:
   generating a header of each of the at least one second packet, wherein the header of each second packet comprises information of the second packet; and
   writing the first packet and the at least one second packet with the corresponding header into the buffer.

7. The method of claim 6, wherein the step of modifying the descriptor according to the multiple packets stored in the buffer to generate the modified descriptor comprises:
   modifying the descriptor to add a first packet information field and a total data amount/total packet number field to generate the modified descriptor according to the multiple packets written into the buffer, wherein the first packet information field comprises information of the packet and an address of the first packet in the system memory; and the total data amount/total packet number field records total amount of data stored in the buffer or a number of the multiple packets.

8. The method of claim 7, wherein the information of the first packet comprises a size of the first packet, and the information of the second packet comprises a size of the second packet.

9. The method of claim 7, wherein the modified descriptor further comprises a multi-packet tag field, wherein the multi-packet tag field records whether the buffer stores multiple packets or only one packet.

10. A system comprising of: a processing circuit within a network card, configured to perform the steps of:
reading a descriptor from a system memory external to the network card, where the descriptor comprises a buffer start address field and a buffer size field, wherein the buffer start address field comprises a start address of a buffer in the system memory, and the buffer size field indicates a size of the buffer;
receiving multiple packets, and writing the multiple packets in to the buffer;
modifying the descriptor according to the multiple packets stored in the buffer to generate a modified descriptor, wherein the modified descriptor only comprises information of part of the multiple packets or does not comprise information of any one of the multiple packets; and
writing the modified descriptor into the system memory.

11. The system of claim 10, wherein the step of receiving the multiple packets, and writing the multiple packets in to the buffer comprises:
generating headers of the multiple packets, respectively, wherein the header of each packet comprises the information of the packet; and
writing the multiple packets with the corresponding headers into the buffer in sequence.

12. The system of claim 11, wherein the step of modifying the descriptor according to the multiple packets stored in the buffer to generate the modified descriptor comprises:
modifying the descriptor to add a first packet information field and a total data amount/total packet number field to generate the modified descriptor according to the multiple packets written into the buffer, wherein the first packet information field comprises the start address of the buffer in the system memory or an address of the header of a first packet of the plurality of packets; and the total data amount/total packet number field records total amount of data stored in the buffer or a number of the multiple packets.

13. The system of claim 12, wherein the modified descriptor further comprises a multi-packet tag field, wherein the multi-packet tag field records whether the buffer stores multiple packets or only one packet.

14. The system of claim 11, wherein the information of the packet comprises a size of the packet.

15. The system of claim 10, wherein the multiple packets comprise a first packet and at least one second packet; and the step of receiving the multiple packets, and writing the multiple packets in to the buffer comprises:
generating a header of each of the at least one second packet, wherein the header of each second packet comprises information of the second packet; and
writing the first packet and the at least one second packet with the corresponding header into the buffer.

16. The system of claim 15, wherein the step of modifying the descriptor according to the multiple packets stored in the buffer to generate the modified descriptor comprises:
modifying the descriptor to add a first packet information field and a total data amount/total packet number field to generate the modified descriptor according to the multiple packets written into the buffer, wherein the first packet information field comprises information of the packet and an address of the first packet in the system memory; and the total data amount/total packet number field records total amount of data stored in the buffer or a number of the multiple packets.

17. The system of claim 16, wherein the information of the first packet comprises a size of the first packet, and the information of the second packet comprises a size of the second packet.

18. The system of claim 16, wherein the modified descriptor further comprises a multi-packet tag field, wherein the multi-packet tag field records whether the buffer stores multiple packets or only one packet.

* * * * *